US012657892B2

(12) United States Patent
Kim et al.

(10) Patent No.: US 12,657,892 B2
(45) Date of Patent: Jun. 16, 2026

(54) INTRUDER DETECTION METHOD BASED ON MULTIPLE CAMERA IMAGES AND VIDEO SURVEILLANCE SYSTEM SUITABLE FOR THE SAME

(71) Applicant: ELECTRONICS AND TELECOMMUNICATIONS RESEARCH INSTITUTE, Daejeon (KR)

(72) Inventors: Young Il Kim, Daejeon (KR); Seong Hee Park, Daejeon (KR); Geon Min Yeo, Daejeon (KR); Il Woo Lee, Daejeon (KR); Wun Cheol Jeong, Daejeon (KR); Tae Wook Heo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 365 days.

(21) Appl. No.: 18/240,965

(22) Filed: Aug. 31, 2023

(65) Prior Publication Data

US 2024/0078799 A1     Mar. 7, 2024

(30) Foreign Application Priority Data

Sep. 2, 2022     (KR) ........................ 10-2022-0111588
Aug. 29, 2023     (KR) ........................ 10-2023-0113707

(51) Int. Cl.
*G06V 10/80*          (2022.01)
*G06T 3/60*           (2024.01)
(Continued)

(52) U.S. Cl.
CPC .............. *G06V 10/806* (2022.01); *G06T 3/60* (2013.01); *G06T 7/73* (2017.01); *G06V 10/764* (2022.01);
(Continued)

(58) Field of Classification Search
CPC .............. G06V 10/805; G06V 10/764; G06V 10/7715; G06V 10/809; G06V 10/82;
(Continued)

(56) References Cited

U.S. PATENT DOCUMENTS 10,963,680 B2 *  3/2021  Prashant ................ G06V 20/52
11,954,932 B2 *  4/2024  Lee ......................... G06F 18/22
(Continued)

FOREIGN PATENT DOCUMENTS

CN        111325089 A  *  6/2020  ............. G06V 20/52
FR          3104874 A1 *  6/2021  ............. H04N 7/181
(Continued)

OTHER PUBLICATIONS

Sijie Yan, et al., "Spatial Temporal Graph Convolutional Networks for Skeleton-Based Action Recognition", arXiv: 1801.07455v2 [cs. CV] Jan. 25, 2018.

*Primary Examiner* — Delomia L Gilliard
(74) *Attorney, Agent, or Firm* — LRK PATENT LAW FIRM

(57)          ABSTRACT

An exemplary embodiment provides an intruder detection method capable of accurately detecting an intruder and estimating an abnormal behavior of the intruder even when viewpoints of acquired images are different from each other. An intruder detection method is suitable for being performed by an intruder detection device for detecting an intruder based on images and includes: receiving input images acquired by multiple cameras; extracting feature maps associated with a plurality of viewpoints by applying the input
(Continued)

images to a plurality of convolutional neural networks provided separately for the plurality of viewpoints of the images; and detecting the intruder based on the feature maps associated with the plurality of viewpoints.

18 Claims, 10 Drawing Sheets

(51) Int. Cl.

| | |
|---|---|
| *G06T 7/73* | (2017.01) |
| *G06V 10/764* | (2022.01) |
| *G06V 10/77* | (2022.01) |
| *G06V 10/82* | (2022.01) |
| *G06V 20/52* | (2022.01) |
| *G06V 40/20* | (2022.01) |

(52) U.S. Cl.
CPC ........ *G06V 10/7715* (2022.01); *G06V 10/809* (2022.01); *G06V 10/82* (2022.01); *G06V 20/52* (2022.01); *G06V 40/20* (2022.01); *G06T 2207/10016* (2013.01); *G06T 2207/20084* (2013.01); *G06T 2207/30196* (2013.01); *G06T 2207/30232* (2013.01); *G06T 2207/30244* (2013.01)

(58) Field of Classification Search
CPC .......... G06V 20/52; G06V 40/20; G06T 3/60; G06T 7/73; G06T 2207/10016; G06T 2207/20084; G06T 2207/30196; G06T 2207/30232; G06T 2207/30244
See application file for complete search history.

(56) References Cited

U.S. PATENT DOCUMENTS

| | | | | |
|---|---|---|---|---|
| 12,106,643 | B2 * | 10/2024 | Kobori ................... | G06V 40/20 |
| 12,456,030 | B2 * | 10/2025 | Lin ......................... | G06F 17/15 |
| 2008/0025568 | A1 * | 1/2008 | Han ...................... | G06V 10/50 |
| | | | | 382/103 |
| 2015/0269427 | A1 * | 9/2015 | Kim ....................... | G06V 20/52 |
| | | | | 348/159 |
| 2016/0217345 | A1 * | 7/2016 | Appel ...................... | G06T 7/20 |
| 2020/0143205 | A1 * | 5/2020 | Yao ........................ | G06V 20/00 |
| 2020/0272863 | A1 | 8/2020 | Lee et al. | |
| 2021/0110275 | A1 * | 4/2021 | Chen .................... | G06V 10/751 |
| 2022/0004775 | A1 * | 1/2022 | Flick ..................... | G06V 40/20 |
| 2022/0051433 | A1 * | 2/2022 | Sohn ..................... | G06V 20/64 |
| 2022/0147773 | A1 | 5/2022 | Lee et al. | |
| 2022/0189155 | A1 | 6/2022 | Wu et al. | |
| 2022/0215531 | A1 * | 7/2022 | Azernikov ........... | G06T 7/0012 |
| 2022/0327730 | A1 * | 10/2022 | Meier ................. | G06N 3/0455 |
| 2022/0408070 | A1 * | 12/2022 | Hirt ...................... | G06T 3/4038 |
| 2023/0153943 | A1 * | 5/2023 | Kuen ................... | G06V 10/751 |
| | | | | 382/100 |
| 2023/0164336 | A1 * | 5/2023 | Cricri .................... | H04N 19/46 |
| | | | | 375/240.08 |
| 2024/0193923 | A1 * | 6/2024 | Wang ................... | G06V 10/454 |
| 2025/0316063 | A1 * | 10/2025 | Singh ...................... | G06T 11/00 |
| 2025/0317665 | A1 * | 10/2025 | Gupta ................... | H04N 23/73 |

FOREIGN PATENT DOCUMENTS

| | | | | | | |
|---|---|---|---|---|---|---|
| JP | 2012198821 | A | * | 10/2012 | | |
| KR | 10-2019-0056873 | A | | 5/2019 | | |
| KR | 10-2019-0130692 | A | | 11/2019 | | |
| KR | 20190130692 | A | * | 11/2019 | .............. | G06N 3/04 |
| KR | 10-2021-0061894 | A | | 5/2021 | | |
| KR | 20210053534 | A | * | 5/2021 | ............. | G06V 40/20 |
| KR | 10-2284155 | B1 | | 7/2021 | | |
| KR | 10-2021-0123823 | A | | 10/2021 | | |
| KR | 10-2327860 | B1 | | 11/2021 | | |

* cited by examiner

FIG. 3

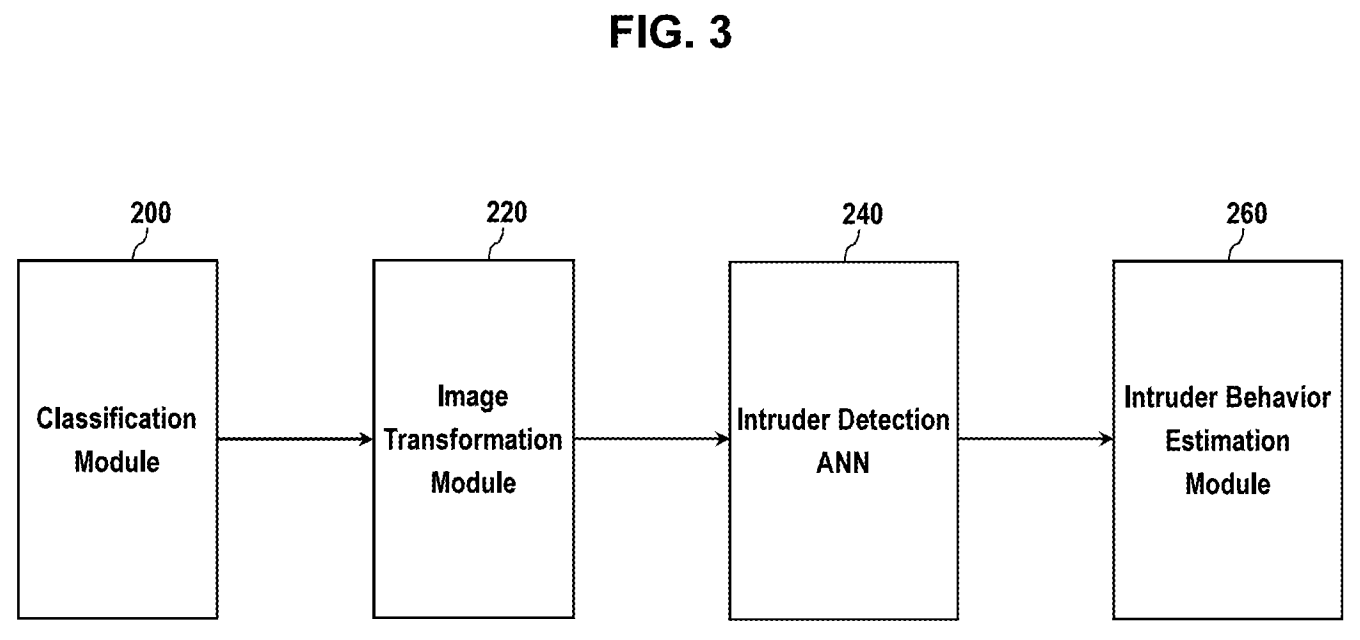

200 Classification Module

220 Image Transformation Module

240 Intruder Detection ANN

260 Intruder Behavior Estimation Module

FIG. 8

| | Detailed Postures | Posture Holding Time (sec) |
|---|---|---|
| Behavior #1 | Posture #1, Posture #2, Posture #4, Posture #5 | 1, 2, 1, 3 |
| Behavior #2 | Posture #1, Posture #5, Posture #6, Posture #8 | 2, 2, 1, 4 |
| ... | ... | ... |
| Behavior #N | Posture #3, Posture #1, Posture #3, Posture #3 | 1, 1, 5, 3 |

INTRUDER DETECTION METHOD BASED ON MULTIPLE CAMERA IMAGES AND VIDEO SURVEILLANCE SYSTEM SUITABLE FOR THE SAME

CROSS-REFERENCE TO RELATED APPLICATIONS

The present application claims convention priorities under 35 U.S.C. § 119(a) based on Korean Patent Applications No 10-2022-0111588 filed on Sep. 2, 2022, and No. 10-2023-0113707 filed on Aug. 29, 2023, the entire contents of which are incorporated herein in their entireties by reference.

BACKGROUND

1. Technical Field

The present disclosure relates to a closed circuit television (CCTV) surveillance method and system and, more particularly, to a method for detecting an intruder in a monitored area using a plurality of cameras. In addition, the present disclosure relates to a video surveillance system suitable for implementing the intruder detection method.

2. Description of Related Art

A video surveillance system using a monitoring camera device is widely being used to protect facilities or human lives from external attacks. The video surveillance system is widespread not only in public facilities and business buildings requiring the security, but also in roads and residential areas. The video surveillance system generally acquires images using a plurality of cameras installed in the monitored area and analyzes the acquired images to detect an intruder having entered the monitored area with no authorization and estimate an abnormal behavior of the intruder. In particular, an artificial neural network learned to detect or classify an object included in an image is widely being used in the video surveillance system nowadays.

In order to detect an intruder from a long distance, it is desirable to install the plurality of cameras operating as image sensors at high positions from ground or positions not hidden by obstacles. As a result, the larger the facility to be monitored and the wider the monitored area, the more different the installation heights or facing directions of the cameras in the video surveillance system. Accordingly, viewpoints of images acquired by the plurality of cameras may be very different from each other, and postures of moving object in the images may also be different for each image. Pan-tilt-zoom control of the cameras may further diversify the viewpoints of the images. Moreover, movement directions of a moving object which may be an intruder within the monitored area may make the viewpoints of the moving object in the images more complicated. An application of heterogeneous images with different viewpoints to an artificial neural network may increase a possibility of an error compared with a case of using images with homogenized viewpoints, for example, where all images are taken from a front or a side of the moving object.

SUMMARY

Exemplary embodiments provide an intruder detection method capable of accurately detecting an intruder and estimating an abnormal behavior of the intruder even when viewpoints of acquired images are different from each other.

Exemplary embodiments provide a video surveillance system capable of accurately detecting the intruder and estimating the abnormal behavior of the intruder regardless of a difference in the viewpoints of the acquired images.

According to an aspect of an exemplary embodiment, an intruder detection method is performed by an intruder detection device for detecting an intruder based on images and includes: receiving input images acquired by multiple cameras; extracting feature maps associated with a plurality of viewpoints by applying the input images to a plurality of convolutional neural networks provided separately for the plurality of viewpoints of the images; and detecting the intruder based on the feature maps associated with the plurality of viewpoints.

The operation of extracting the feature maps associated with the plurality of viewpoints by applying the input images to the plurality of convolutional neural networks may include: classifying the input images into a plurality of image categories according to viewpoints of the input images; and applying images of each image category to respective one of the plurality of convolutional neural networks associated with the image category.

The plurality of image categories may include a front view image, a lateral view image, a planar view image, and a rear view image of an object.

The operation of classifying the input images into the plurality of image categories according to the viewpoints of the input images may include: extracting a skeleton of the object from each input image; and determining an image viewpoint of the input image based on a length ratio between body parts in the skeleton.

The intruder detection method may further include: transforming at least some of the images of each image category by rotating each image such that the object in each image elongates in a vertical direction in the image. In such a case, transformed images may be applied to respective one of the plurality of convolutional neural networks associated with the image category.

The operation of detecting the intruder based on the feature maps associated with the plurality of viewpoints may include: generating a combined feature map by combining the feature maps associated with the plurality of viewpoints; and determining an intruder detection result based on the combined feature map.

The operation of generating the combined feature map by combining the feature maps associated with the plurality of viewpoints may include: calculating a weighted sum by applying predetermined weights on the feature maps associated with the plurality of viewpoints.

The predetermined weights for the feature maps associated with the plurality of viewpoints may be determined to minimize a loss function in the training of the convolutional neural networks.

The operation of detecting the intruder based on the feature maps associated with the plurality of viewpoints may include obtaining a plurality of detection results by performing an intruder detection based on each of the feature maps associated with the plurality of viewpoints; and combining the plurality of detection results.

The operation of detecting the intruder based on the feature maps associated with the plurality of viewpoints may include: generating a combined feature map by combining the feature maps associated with the plurality of viewpoints and determining a first decision result based on the combined feature map; obtaining a plurality of detection results by performing an intruder detection based on each of the feature maps associated with the plurality of viewpoints and combining the plurality of detection results to determine a second decision result; and combining the first decision result and the second decision result to determine a final decision result.

The intruder detection method may further include detecting continual postures of the intruder in images associated with the intruder to estimate a behavior of the intruder.

The operation of detecting continual postures of the intruder in images associated with the intruder to estimate a behavior of the intruder may include: classifying and accumulating the postures of the intruder in the images associated with the intruder; and comparing a sequence of accumulated postures with a posture pattern for a predetermined behavior.

The operation of classifying and accumulating the postures of the intruder in the images associated with the intruder may include: extracting a skeleton of an object from each input image; and determining the posture of the intruder based on the skeleton.

According to another aspect of an exemplary embodiment, an intruder detection method is suitable for detecting an intruder based on images and includes a memory storing program instructions; and a processor coupled to the memory and executing the program instructions stored in the memory. The program instructions, when executed by the processor, causes the processor to: establish a plurality of convolutional neural networks each being provided separately for respective one of a plurality of viewpoints of images; receive input images acquired by multiple cameras; extract feature maps associated with the plurality of viewpoints by applying the input images to the plurality of convolutional neural networks associated with the plurality of viewpoints of the images; and detect the intruder based on the feature maps associated with the plurality of viewpoints.

The program instructions causing the processor to extract the feature maps associated with the plurality of viewpoints by applying the input images to the plurality of convolutional neural networks may include instructions causing the processor to: classify the input images into a plurality of image categories according to viewpoints of the input images; and apply images of each image category to respective one of the plurality of convolutional neural networks associated with the image category.

The program instructions causing the processor to classify the input images into the plurality of image categories according to the viewpoints of the input images may include instructions causing the processor to: extract a skeleton of the object from each input image; and determine an image viewpoint of the input image based on a length ratio between body parts in the skeleton.

The program instructions may further cause the processor to: transform at least some of the images of each image category by rotating each image such that the object in each image elongates in a vertical direction in the image. In such a case, transformed images may be applied to respective one of the plurality of convolutional neural networks associated with the image category.

The program instructions causing the processor to detect the intruder based on the feature maps associated with the plurality of viewpoints may include instructions causing the processor to: generate a combined feature map by combining the feature maps associated with the plurality of viewpoints and determine a first decision result based on the combined feature map; obtain a plurality of detection results by performing an intruder detection based on each of the feature maps associated with the plurality of viewpoints and combining the plurality of detection results to determine a second decision result; and combine the first decision result and the second decision result to determine a final decision result.

The program instructions may further cause the processor to detect continual postures of the intruder in images associated with the intruder to estimate a behavior of the intruder.

According to exemplary embodiments, a feature map is extracted by a neural network for each image category classified according to a viewpoint of each image among multi-view images acquired by a plurality of cameras. The intruder may be detected based on an aggregate feature map formed by combining the feature maps for all or some of the categories while being detected separately based on the feature maps for all or some of the categories, and a final detection result may be determined by combining two detection results. Accordingly, the present disclosure may enhance an accuracy of the detection result. Furthermore, posture information including postures determined based on a skeleton of the intruder and posture holding times are accumulated, and a behavior of the intruder may be estimated based on the accumulated posture information. Accordingly, it is possible to further increase the accuracy of detecting the intruder in addition to an accuracy of estimating the abnormal behavior.

The exemplary embodiments may increase the detection accuracy by integrally utilizing the images of intrusion objects having different camera viewpoints and may improve security capabilities for facilities.

BRIEF DESCRIPTION OF THE DRAWINGS

In order that the disclosure may be well understood, there will now be described various forms thereof, given by way of example, reference being made to the accompanying drawings, in which:

FIG. 3 is a block diagram of an intruder detection program executed by the detection server shown in FIG. 2;

FIG. 8 is an illustration showing an operating principle of a feature map combining layer shown in FIG. 7;

5

Figure 1:
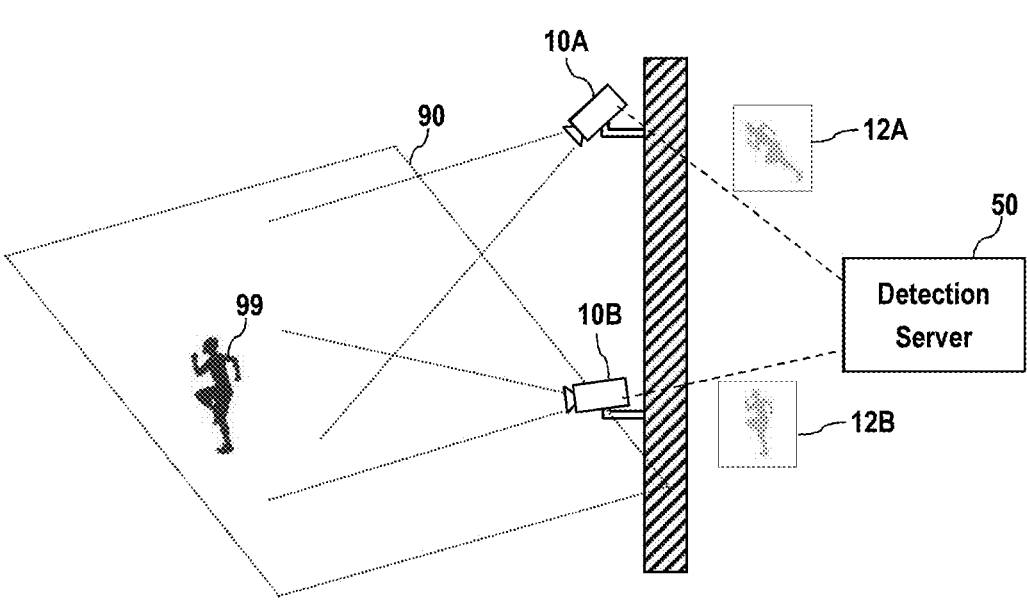
FIG. 1 illustrates a configuration a video surveillance system according to an exemplary embodiment of the present disclosure.

The drawings described herein are for illustration purposes only and are not intended to limit the scope of the present disclosure in any way.

DETAILED DESCRIPTION

For a clearer understanding of the features and advantages of the present disclosure, exemplary embodiments of the present disclosure will be described in detail with reference to the accompanied drawings. However, it should be understood that the present disclosure is not limited to particular embodiments disclosed herein but includes all modifications, equivalents, and alternatives falling within the spirit and scope of the present disclosure. In the drawings, similar or corresponding components may be designated by the same or similar reference numerals.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure. As used herein, the term "and/or" may include a presence of one or more of the associated listed items and any and all combinations of the listed items.

In the description of exemplary embodiments of the present disclosure, "at least one of A and B" may mean "at least one of A or B" or "at least one of combinations of one or more of A and B". In addition, in the description of exemplary embodiments of the present disclosure, "one or more of A and B" may mean "one or more of A or B" or "one or more of combinations of one or more of A and B".

When a component is referred to as being "connected" or "coupled" to another component, the component may be directly connected or coupled logically or physically to the other component or indirectly through an object therebetween. Contrarily, when a component is referred to as being "directly connected" or "directly coupled" to another component, it is to be understood that there is no intervening object between the components. Other words used to describe the relationship between elements should be interpreted in a similar fashion.

The terminologies are used herein for the purpose of describing particular exemplary embodiments only and are not intended to limit the present disclosure. The singular forms include plural referents as well unless the context clearly dictates otherwise. Also, the expressions "comprises," "includes," "constructed," "configured" are used to refer a presence of a combination of stated features, numbers, processing steps, operations, elements, or components, but are not intended to preclude a presence or addition of another feature, number, processing step, operation, element, or component.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with their meanings in the context of related literatures and will not be interpreted as having ideal or excessively formal meanings unless explicitly defined in the present application.

Exemplary embodiments of the present disclosure will now be described in detail with reference to the accompanying drawings. In order to facilitate general understanding in describing the present disclosure, the same components in the drawings are denoted with the same reference signs, and repeated description thereof will be omitted.

FIG. 1 illustrates a video surveillance system according to an exemplary embodiment of the present disclosure. The video surveillance system may include a plurality of cameras 10A and 10B installed in or around a monitored area 90 and a detection server 50 receiving input images 12A and 12B acquired by the plurality of cameras 10A and 10B, detecting an intruder having entered the monitored area with no authorization based on the input images 12A and 12B, and estimating an abnormal behavior of the intruder. The monitored area 90 may be defined by boundaries arbitrarily set by an administrator in advance. The plurality of cameras 10A and 10B may be installed at horizontal and vertical positions from each other. At least some of the plurality of cameras 10A and 10B may have capabilities of controlling panning, tilting, and/or zooming. The panning, tilting, and/or zooming of each camera may be autonomously controlled by a program stored in the camera or may be controlled in response to a control signal from the detection server 50.

The detection server 50 may receive the input images acquired by the cameras 10A and 10B, classify the input images into representative viewpoints, and form multiple image channels from the input images according to the viewpoints. For example, the detection server 50 may classify an input image from a camera installed at a low position as a front view image, a lateral view image, or a rear view image while classifying an input image from a camera installed at a high position as a planar view image. In addition, the detection server 50 may transform each view image by rotating and/or scaling the image. The detection server 50 may detect a moving object from classified images or transformed images and classify the moving object as an intruder. The detection server 50 may combine calculation results for multiple channels in order to increase an accuracy of detecting the intruder and estimating an abnormal behavior. In addition, the detection server 50 may estimate an abnormal behavior of the intruder in order to increase the accuracy of detecting the intruder and estimating the abnormal behavior.

Figure 2:
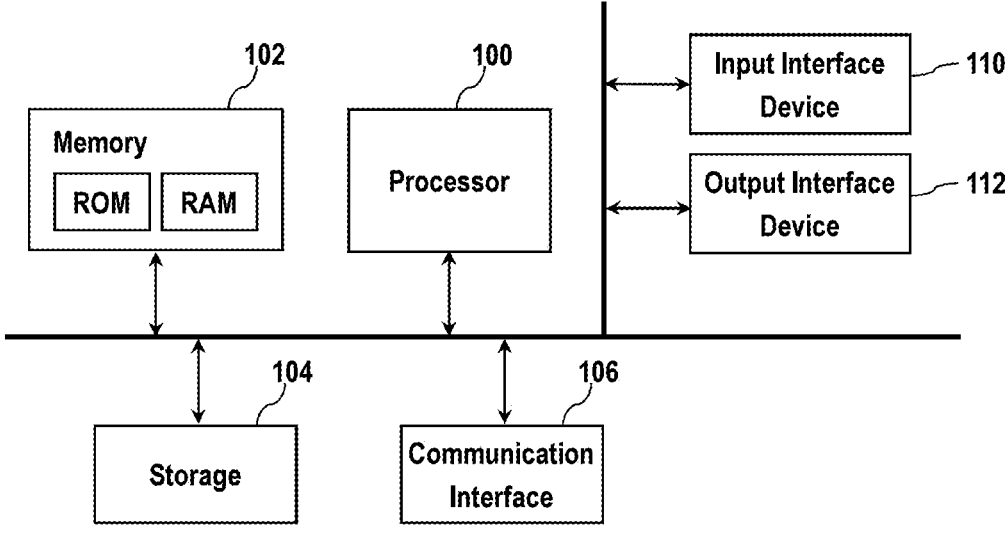
FIG. 2 is a block diagram of a detection server according to an exemplary embodiment of the present disclosure.

FIG. 2 is a block diagram illustrating a physical configuration of the detection server 50. The detection server 50 may include a processor 100, a memory 102, a storage 104, and a communication interface. In addition, the detection server 50 may further include an input interface device 110 and an output interface device 112. The components of the detection server 50 may be connected to each other by a bus.

The processor 100 may execute program instructions stored in the memory 102 or the storage 104. The processor 100 may include a central processing unit (CPU) or a graphics processing unit (GPU), or may be implemented by another kind of dedicated processor suitable for performing the method of the present disclosure. The processor 100 may execute program instructions for implementing an intruder detection method according to the present disclosure.

The memory 102 may include, for example, a volatile memory such as a read only memory (ROM) and a nonvolatile memory such as a random access memory (RAM). The memory 102 may load the program instructions stored in the storage 104 to provide to the processor 100 so that the processor 100 may execute the program instructions. In addition, the memory 102 may temporarily store data generated in the course of the execution of the program instructions for the intruder detection program.

The storage 104 may include an intangible recording medium suitable for storing the program instructions, data files, data structures, and a combination thereof. Examples of the storage medium may include magnetic media such as a hard disk, a floppy disk, and a magnetic tape, optical media such as a compact disk read only memory (CD-ROM) and a digital video disk (DVD), magneto-optical medium such as a floptical disk, and semiconductor memories such as ROM, RAM, a flash memory, and a solid-state drive (SSD). The storage 104 may store the program and database for implementing the intruder detection according to the present disclosure.

The communication interface 106 may include one or more of a wireless LAN (WLAN) interface, a power line communications (PLC) module, a fourth generation long-term evolution (4G LTE) or fifth generation new radio (5G NR) interface, or a similar communication interface to enable the detection server 50 to communicates with the cameras 10A and 10B and other external devices. The input interface device 110 allows a user, i.e., an administrator, to input manipulations or commands to the detection server 50, and the output interface device 112 may display an operation state and an operation result of the detection server 50.

FIG. 3 is a block diagram of an intruder detection program executed by the detection server 50 shown in FIG. 2. The intruder detection program may include a classification module 200, an image transformation module 220, an intruder detection artificial neural network (ANN) 240, and an intruder behavior estimation module 260. The intruder detection program may be implemented based on an artificial neural network model which may be trained by a machine learning.

The classification module 200 may classify the viewpoints of the input images received from the cameras 10A and 10B, for example, into representative viewpoints or typical viewpoints. The representative viewpoints or typical viewpoints may include at least some of a front view, a lateral view, a planar view, and a rear view. The classification module 200 may classify each input image into a certain category according to the classification of the viewpoint. The category of the images may include at least some of a front view image, a lateral view image, a planar view image, and a rear view image.

The image transformation module 220 may transform each image classified into one of the categories by the classification module 200 by rotating or scaling the image. The rotation of the image may be performed such that at least one horizontal line in each image becomes parallel to a certain horizontal reference line. The scaling of the image may be an optional operation performed when a scale of the image is too large or too small. The image transformation module 220 may output each of the images received from the classification module 200 or its transformed images as separate video channels defined by the viewpoints, i.e., as one of a transformed front view image, a transformed lateral view image, a transformed planar view image, and a transformed rear view image.

The intruder detection ANN 240 may receive at least some of the transformed front view image, the transformed lateral view image, the transformed planar view image, and the transformed rear view image from the image transformation module 220, and detect a moving object using the received images. In addition, the intruder detection ANN 240 may classify whether the moving object is an intruder. The intruder detection ANN 240 extracts feature maps separately from images of each of the image channels. In an exemplary embodiment, the intruder detection ANN 240 may detect the moving object from an aggregate feature map formed by combining the feature maps for all or some of the image channels. In addition, the intruder detection ANN 240 may detect the moving object from the feature map of each video channel and combine detection results for all or some of the channels. Further, the intruder detection ANN 240 may finally determine a final detection result by combining the detection results of the two types. The detection result output by the intruder detection ANN 240 may include information on whether an intruder exists or not and a selected representative channel image.

When an intruder is detected, the intruder behavior estimation module 260 may estimate an abnormal behavior of the intruder in order to increase an accuracy of the intruder detection result.

In an exemplary embodiment, the classification module 200 may continually determine whether a real-time video stream is input from the cameras and provide a status signal indicating whether the real-time video stream exist or not to the intruder detection ANN 240. The intruder detection ANN 240 may be trained using previous image data stored in a database (not shown) and detection results when the state signal associated with multiple cameras indicate an absence of the real-time image stream. The intruder detection ANN 240 may perform the inference in the trained state. Meanwhile, the learning of the intruder detection ANN 240 may also be performed in real time based on the intruder detection result and a final decision result determined by an administrator during a real-time monitoring operation. On the other hand, whether the real-time video stream is input or not may be determined by the image transformation module 220 or the intruder detection ANN 240 instead of the classification module 200.

Figure 4:
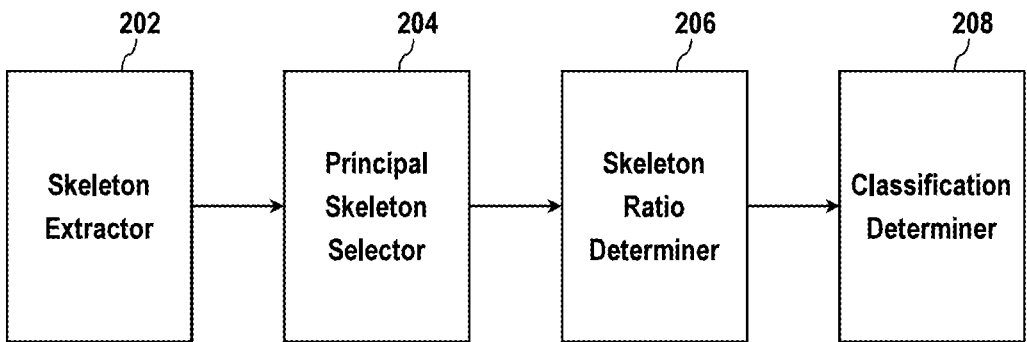
FIG. 4 is a detailed block diagram of an exemplary embodiment of a classification module shown in FIG. 3.
Figure 5A:
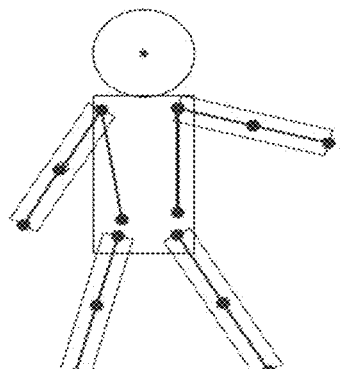
FIGS. 5A through 5D illustrate examples of skeletons according to viewpoints.
Figure 5B:
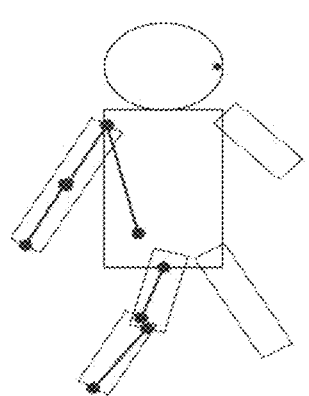
Figure 5C:
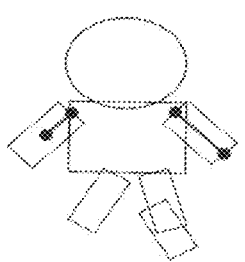
Figure 5D:
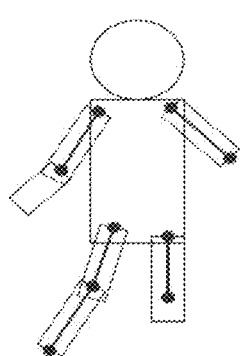

FIG. 4 is a detailed block diagram of the classification module 200 shown in FIG. 3. The classification module 200 may include a skeleton extractor 202, a principal skeleton selector 204, a skeleton proportion determiner 206, and a classification determiner 208.

The skeleton extractor 202 may extract an object that may be determined as a human being from each input image and extract a skeleton of the object. Examples of the skeletons extracted from the images are shown in FIGS. 5A through 5D. In detail, FIGS. 5A through 5D show examples of skeletons in the front view image, the lateral view image, the planar view image, and the rear view image, respectively. As shown in the drawings, the skeleton may be represented as a graph sequence of line segments representing body parts. In an exemplary embodiment, the skeleton may be extracted based on an upper arm, a forearm, a thigh, a lower leg, and left and right contours of the torso of an object in the image. The skeleton extractor 202 may be implemented based on an artificial neural network such as PoseNet and may be used after a training of the network.

The main skeleton selector 204 may determine, for each input image, a principal skeleton suitable for use in classifying the viewpoint from the skeleton. The expression 'principal skeleton' used herein refers to a body part that may be used to identify a contour of a human body and may include all or some of the upper arms, the forearms, the thighs, the lower legs, and the torso contours on both sides. The skeleton proportion determiner 206 may determine length ratios between any two or more body parts in the principal skeleton, e.g., ratios of lengths between adjacent human joints.

The classification determiner 208 may determine the viewpoint of each image based on the presence or absence of each body part in the principal skeleton and/or the length ratios between the adjacent joints. That is, the classification determiner 208 may determine the viewpoint of the image based on the number of body parts included in the principal skeleton and/or the ratio of lengths between the body parts. As mentioned above, the viewpoint of each image may be selected from among predetermined typical viewpoints such as the front view, the lateral view, the planar view, and the rear view. After the viewpoint classification of each image is determined, the corresponding input image may be classified into one of the image categories including the front view image, the lateral view image, the planar view image, and the rear view image according to the viewpoint classification to be provided to the image transformation module 220.

Figure 6:
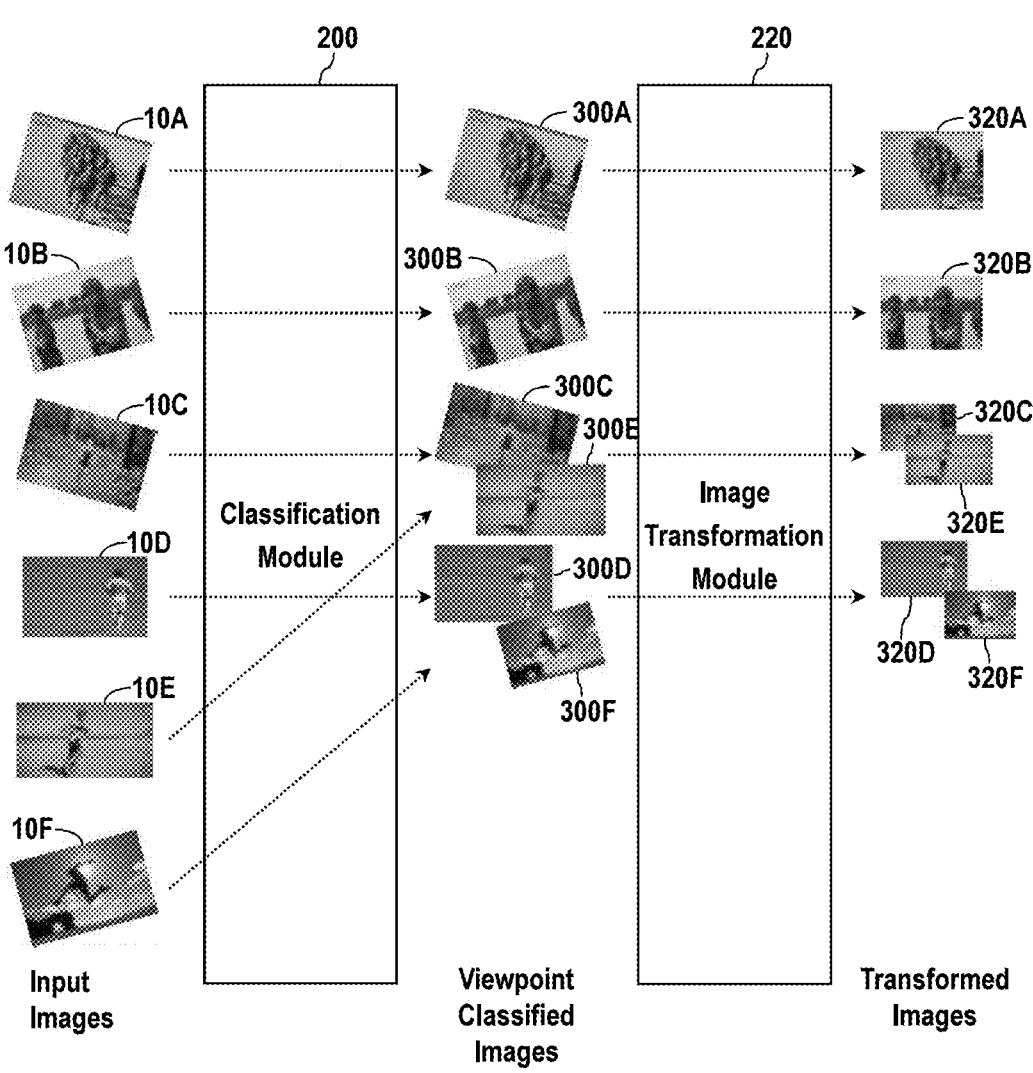
FIG. 6 is an illustration for explaining an operation of the classification module shown in FIG. 4.

FIG. 6 is an illustration of examples of the operation of the classification module 200 and the image transformation module 220.

The classification module 200 may extract an object that may be determined as a human body from each input image, extract the skeleton of the object, determine the principal skeleton, determine the ratio of the lengths between the body parts, and determine the viewpoint of the corresponding image based on the presence or absence of the body parts and/or the ratio of the lengths between the body parts. Therefore, the classification module 200 may classify each input image into one of the image categories including the front view image, the lateral view image, the planar view image, and the rear view image according to the viewpoint classification to provide to the image transformation module 220. The image transformation module 220 may rotate the image of each viewpoint from the classification module 200 so that at least one horizontal line becomes parallel to a predetermined horizontal reference line. In addition, the image transformation module 220 may convert the size of each image by scaling the image. The image transformation module 220 may output each of the received view image or its transformed image as the transformed front view image, the transformed lateral view image, the transformed planar view image, or the transformed rear view image.

For example, the viewpoint of the image 10A may be determined as the planar view, and the image 10A may be classified into the planar view image 300A. The planar view image 300A may be rotated and converted into the transformed planar view image 320A by the image transformation module 220. The viewpoint of the image 10B may be determined as the lateral view, and the image 10B may be classified into the lateral view image 300B. The lateral view image 300B may be rotated and converted into the transformed lateral view image 320B by the image transformation module 220. The viewpoint of the image 10C may be determined as the front view, and the image 10C may be classified into the front view image 300C. The front view image 300C may be rotated and scaled and converted into the transformed front view image 320C by the image transformation module 220.

The viewpoint of the image 10D may be determined as the rear view, and the image 10D may be classified into the rear view image 300D. The rear view image 300D may be scaled and converted into the transformed rear view image 320D by the image transformation module 220. The viewpoint of the image 10C may be determined as the front view, and the image 10E may be classified into the front view image 300E. The front view image 300E may be converted into the transformed front view image 320E by the image transformation module 220. The viewpoint of the image 10F may be determined as the rear view, and the image 10F may be classified into the rear view image 300F. The rear view image 300F may be rotated and scaled and converted into the transformed rear view image 320F by the image transformation module 220. Although heterogeneous images are shown in FIG. 6 for convenience of explanation, associated images may be input and processed actually.

Figure 7:
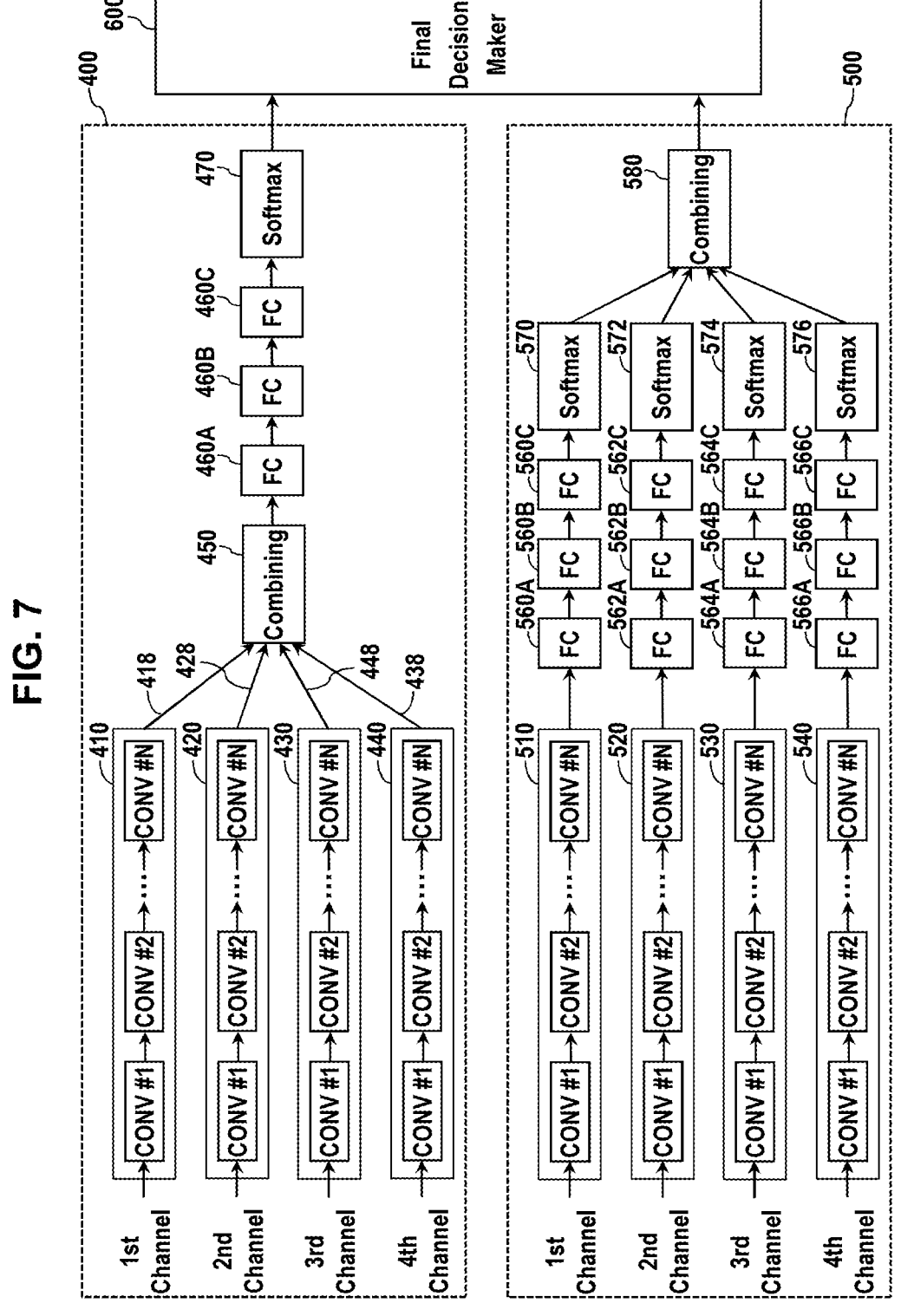
FIG. 7 is a detailed block diagram of an exemplary embodiment of an intruder detection artificial neural network shown in FIG. 3.

FIG. 7 is a detailed block diagram of an exemplary embodiment of the intruder detection artificial neural network (ANN) 240 shown in FIG. 3. In an exemplary embodiment, the intruder detection ANN 240 may include a first network 400, a second network 500, and a final decision maker 600. The first network 400 and the second network 500 may be implemented based on a convolutional neural network (CNN).

The first network 400 receives the transformed front view image, the transformed lateral view image, the transformed planar view image, and/or the transformed rear view image from the image transformation module 220 as separate image channels. The first network 400 may extract feature maps from corresponding images by performing convolutional operations on the images of the respective image channels and combine the feature maps of the image channels. The first network 400 may flatten a two-dimensional (2D) feature map into a one-dimensional (1D) feature map and finally classify the object to detect the intruder.

The first network 400 may include a plurality of convolutional networks 410-440, a feature map combining layer 450, one or more fully-connected (FC) layers 460A-460C, and a softmax layer 470. In an exemplary embodiment, each of the plurality of convolutional networks 410-440 may be provided to correspond to each of the image channels, that is, each of the viewpoints of the images. Accordingly, the transformed view images corresponding to respective viewpoints may be processed by respective convolutional networks. That is, the images with the same viewpoint may be processed by the same convolutional networks 410-440 even if the cameras having acquired the images are different from each other. For example, in the example of FIG. 6, the transformed front view images 320C and 320E may be processed by the first convolutional network 400. Also, the transformed rear view images 320D and 320E may be processed by the fourth convolutional network 440. Meanwhile, in an alternative embodiment, each of the plurality of convolutional networks 410-440 may be provided to correspond to respective one of the camera.

More specifically, the first convolutional network 410 may receive the transformed front view images for the first image channel and extract a feature map for the transformed front view images. The second convolutional network 420 may receive the transformed lateral view images of the second image channel and extract a feature map for the transformed lateral view images. The third convolutional network 430 may receive the transformed planar view images of the third image channel and extract a feature map for the transformed planar view images. The fourth convolutional network 440 may receive the transformed rear view images of the fourth image channel and extract a feature map for the transformed rear view images.

Each of the first through fourth convolutional networks 410-440 may include a plurality of convolutional layers CONV #1-CONV #N. Each convolutional layer CONV #1-CONV #N may extract the feature map for the corresponding images by performing convolution operation with predetermined kernels on the received images or the feature maps from a preceding convolution layer.

Although not shown in the drawing, each convolutional layer CONV #1-CONV #N may include an activation layer. The activation layer selectively activates an output value of a corresponding convolution layer according to an activation function. That is, the activation layer activates the output value if the output value of the convolutional layer is greater than a threshold according to the activation function while deactivating the output value if the output value is smaller than the threshold. A nonlinear function such as a sigmoid function and a ReLU function may be used as the activation function.

Meanwhile, although not shown in the drawing, a pooling layer may be disposed at an end of each convolutional layer CONV #1-CONV #N. The pooling layer reduces a dimension of the feature map output by each convolutional layer CONV #1-CONV #N by selecting a representative value in a unit of a certain pixel block from the feature map to perform a subsampling of the feature map. The pooling may be performed, for example, by a max pooling in which a largest value in the pixel block is selected as the representative value of the pixel block or an average pooling in which an average value is set as the representative value of the pixel block.

A combination of the convolutional layer, the activation layer, and the pooling layer may be repeatedly disposed in each of the convolutional networks 410-440. Accordingly, extraction of the feature maps and subsampling of the feature maps may be repeatedly carried out several times on the transformed viewpoint images.

Figure 8:
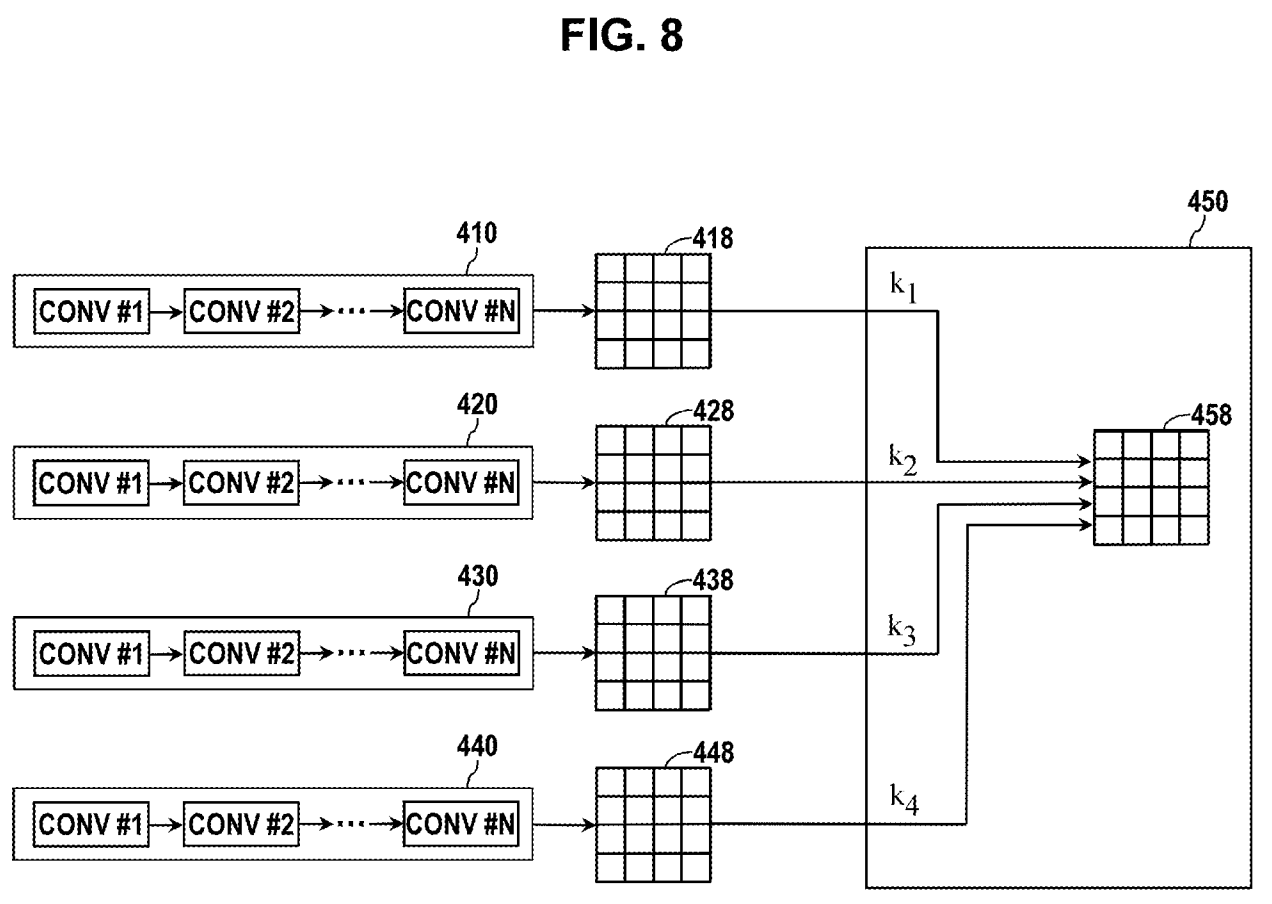

The feature map combining layer 450 may combine the feature maps of each image channel. That is, the feature map combining layer 450 may combine the feature maps 418, 428, 438, and 448 respectively output by the first through fourth convolutional networks 410-440. In an exemplary embodiment, the feature map combining layer 450 may combine the feature maps 418, 428, 438, and 448 and form an aggregate feature map 458 by applying weights k1-k4 to the feature maps 418, 428, 438, and 448 and calculating a weighted sum of the feature maps 428 in a unit of a pixel as shown in FIG. 8. The weights k1-k4 may be acquired by a learning through a back-propagation such that a loss function due to combining is minimized. In another exemplary embodiment, the feature maps 418, 428, 438, and 448 may be combined by calculating a maximum, an average, or a harmonic average of the maximum and the average of the feature maps 418, 428, 438, and 448 in the unit of a pixel.

The fully-connected layer 460A may flatten the 2D combined feature map into the 1D feature map and perform a convolution operation on the 1D feature map. Fully-connected layers 460B and 460C may perform additional convolution operations on the 1D feature map. The softmax layer 470 may detect an intruder by calculating a normalized probability that the moving object is an intruder by a softmax function based on an output of the fully-connected layer 460C. Meanwhile, the second network 500 may receive the transformed front view image, the transformed lateral view image, the transformed planar view image, and/or the transformed rear view image from the image transformation module 220 as separate image channels. The second network 500 may extract feature maps from corresponding images by performing convolutional operations on the images of the respective image channels, flatten the 2D feature map into a 1D feature map, and classify the object. Then, the second network 500 may detect the intruder by combining object classification results for the plurality of image channels by a soft voting method.

The second network 500 may include a plurality of convolutional networks 510-540, fully-connected layers 560A-560C, 562A-562C, 564A-564C, and 566A-566C, softmax layers 570-576, and a combining 580. In an exemplary embodiment, each of the plurality of convolutional networks 510-540 may be provided to correspond to each of the image channels, that is, each of the viewpoints of the images. Accordingly, the transformed view images corresponding to respective viewpoints may be processed by respective convolutional networks. That is, the images with the same viewpoint may be processed by the same convolutional networks 510-540 even if the cameras having acquired the images are different from each other.

More specifically, the fifth convolutional network 510 may receive the transformed front view images for the first image channel and extract a feature map for the transformed front view images. The sixth convolutional network 520 may receive the transformed lateral view images of the second image channel and extract a feature map for the transformed lateral view images. The seventh convolutional network 530 may receive the transformed planar view images of the third image channel and extract a feature map for the transformed planar view images. The eighth convolutional network 540 may receive the transformed rear view images of the fourth image channel and extract a feature map for the transformed rear view images.

Each of the fifth through eighth convolutional networks 510-540 may include a plurality of convolutional layers CONV #1-CONV #N. Each convolutional layer CONV #1-CONV #N may extract the feature map for the corresponding images by performing convolution operation with predetermined kernels on the received images or the feature maps from a preceding convolution layer.

Although not shown in the drawing, each convolutional layer CONV #1-CONV #N may include an activation layer. The activation layer selectively activates an output value of a corresponding convolution layer according to an activation function. That is, the activation layer activates the output value if the output value of the convolutional layer is greater than a threshold according to the activation function while deactivating the output value if the output value is smaller than the threshold. A nonlinear function such as a sigmoid function and a ReLU function may be used as the activation function. Further, a pooling layer may be disposed at an end of each convolutional layer CONV #1-CONV #N. The pooling layer reduces a dimension of the feature map output by each convolutional layer CONV #1-CONV #N by selecting a representative value in a unit of a certain pixel block from the feature map to perform a subsampling of the feature map.

A combination of the convolutional layer, the activation layer, and the pooling layer may be repeatedly disposed in each of the convolutional networks 510-540. Accordingly, extraction of the feature maps and subsampling of the feature maps may be repeatedly carried out several times on the transformed viewpoint images.

The fully-connected layer 560A may flatten the 2D feature map output by the fifth convolutional network 510 into the 1D feature map and perform the convolution operation on the 1D feature map. The fully-connected layers 560B and 560C may perform additional convolution operations on the 1D feature map. The softmax layer 570 may calculate a probability that the moving object is an intruder by the softmax function based on an output of the fully-connected layer 560C. The fully-connected layer 562A may flatten the 2D feature map output by the sixth convolutional network 520 into the 1D feature map and perform the convolution operation on the 1D feature map. The fully-connected layers 562B and 562C may perform additional convolution operations on the 1D feature map. The softmax layer 572 may calculate a probability that the moving object is an intruder by the softmax function based on an output of the fully-connected layer 562C.

The fully-connected layer 564A may flatten the 2D feature map output by the seventh convolutional network 530 into the 1D feature map and perform the convolution operation on the 1D feature map. The fully-connected layers 564B and 564C may perform additional convolution operations on the 1D feature map. The softmax layer 574 may calculate a probability that the moving object is an intruder by the softmax function based on an output of the fully-connected layer 564C. The fully-connected layer 566A may flatten the 2D feature map output by the eighth convolutional network 540 into the 1D feature map and perform the convolution operation on the 1D feature map. The fully-connected layers 566B and 566C may perform additional convolution operations on the 1D feature map. The softmax layer 576 may calculate a probability that the moving object is an intruder by the softmax function based on an output of the fully-connected layer 566C.

The combining layer 580 may combine the probabilities calculated by the softmax layers 570-576 of all the image channels. In an exemplary embodiment, the combining layer 580 may combine the probabilities calculated by the softmax layers 570-576 in a soft voting method to enable to detect the intruder.

The final decision maker 600 combines the detection results of the first network 400 and the second network 500 to finally detect the intruder. The combination of the detection results of the first network 400 and the second network 500 may be performed by a hard voting or the soft voting.

Figure 9:
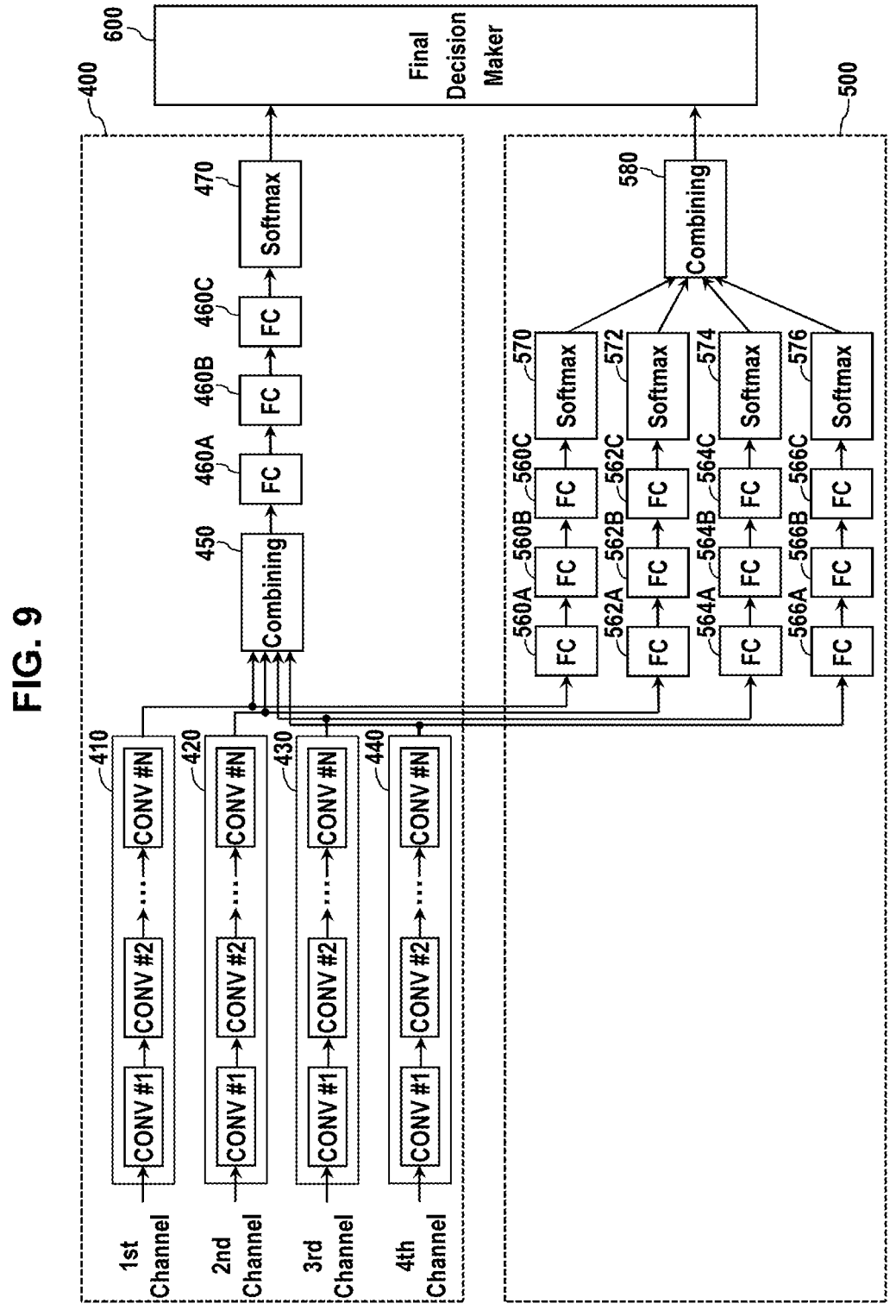
FIG. 9 is a detailed block diagram of another exemplary embodiment of the intruder detection neural network shown in FIG. 3.

On the other hand, although it has been described above that the fifth through the eighth convolutional networks 510-540 are provided separately from the first through the fourth convolutional networks 410-440 for convenience of explanation, the convolutional networks may be shared between the first network 400 and the second network 500. FIG. 9 shows such an embodiment. In the embodiment of FIG. 9, the fifth through the eighth convolutional networks 510-540 are not provided, and the first through the fourth convolutional networks 410-440 calculates the feature maps for the first through the fourth image channels and provide the feature maps to the second network 500.

Figure 10:
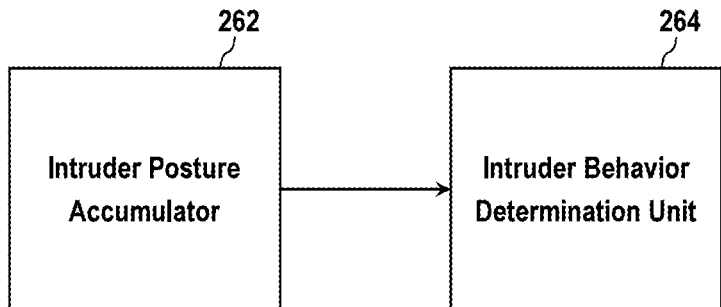
FIG. 10 is a detailed block diagram of an exemplary embodiment of an intruder behavior estimation module shown in FIG. 3.
Figure 11:
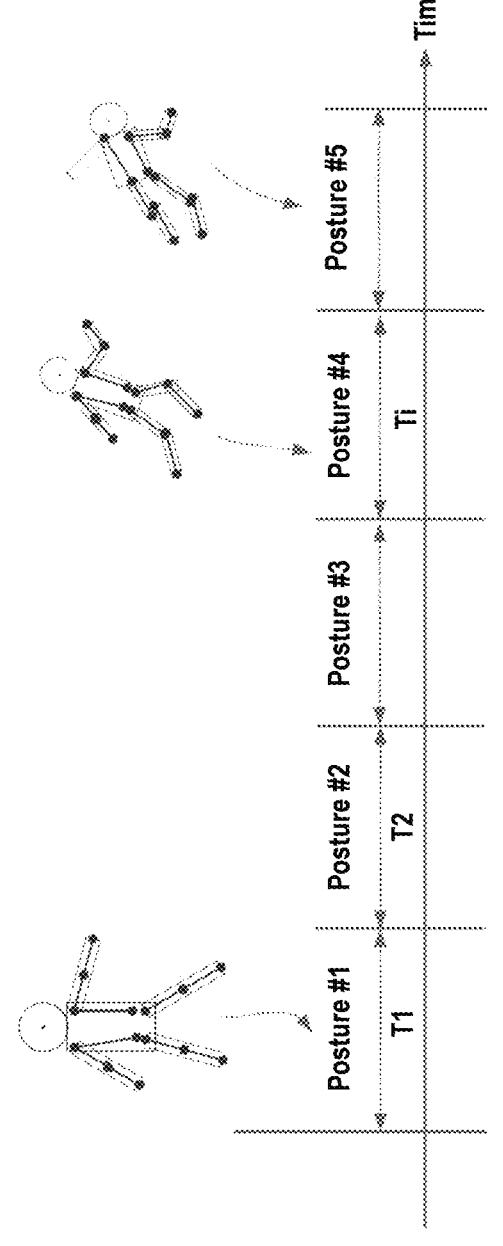
FIG. 11 illustrates a posture record table maintained and managed by the intruder behavior estimation module for classifying behaviors based on a skeleton.

FIG. 10 is a detailed block diagram of an exemplary embodiment of an intruder behavior estimation module 260 shown in FIG. 3. The intruder behavior estimation module 260 may include an intruder posture accumulator 262 and an intruder behavior determination unit 264. When an intruder is detected, the intruder posture accumulator 262 may cumulatively record temporal postures of the detected intruder. FIG. 11 illustrates a posture record table maintained and managed by the intruder posture accumulator 262 to classify the behavior based on the skeleton. The posture information recorded by the intruder posture accumulator 262 may include a detailed posture determined based on the skeleton and the time interval during which the posture is maintained, which may be stored in the memory 102 or the storage 104 in the order of occurrence. The intruder behavior determination unit 264 may determine an abnormal behavior of the intruder by comparing the accumulated intruder posture information with posture patterns of each behavior stored in the database. For example, the intruder behavior determination unit 264 may determine the abnormal behavior of the intruder according to characteristics of the postures such as a number and/or a sequence of successive detailed postures and the holding time of each detailed posture. In an exemplary embodiment, the number and/or sequence of successive detailed postures and the holding time of each detailed posture which are associated with each abnormal behavior may be defined in advance by the administrator. Alternatively, the intruder behavior determination unit 264 may be implemented by an artificial neural network, and the classification the behavior may be determined through a training of the artificial neural network.

As described above, according to exemplary embodiments, the feature map is extracted by the neural network for each image category classified according to the viewpoint of each image among multi-view images acquired by the plurality of cameras. The intruder may be detected based on the aggregate feature map formed by combining the feature maps for all or some of the categories while being detected based on the feature maps for all or some of the categories, and a final detection result may be determined by combining two detection results. Accordingly, the present disclosure may enhance the accuracy of the detection result. Furthermore, posture information including postures determined based on a skeleton of the intruder and posture holding times are accumulated, and the behavior of the intruder may be estimated based on the accumulated posture information. Accordingly, it is possible to further increase the accuracy of detecting the intruder in addition to the accuracy of estimating the abnormal behavior.

As mentioned above, the apparatus and method according to exemplary embodiments of the present disclosure can be implemented by computer-readable program codes or instructions stored on a computer-readable intangible recording medium. The computer-readable recording medium includes all types of recording device storing data which can be read by a computer system. The computer-readable recording medium may be distributed over computer systems connected through a network so that the computer-readable program or codes may be stored and executed in a distributed manner.

The computer-readable recording medium may include a hardware device specially configured to store and execute program instructions, such as a ROM, RAM, and flash memory. The program instructions may include not only machine language codes generated by a compiler, but also high-level language codes executable by a computer using an interpreter or the like.

Some aspects of the present disclosure described above in the context of the device may indicate corresponding descriptions of the method according to the present disclosure, and the blocks or devices may correspond to operations of the method or features of the operations. Similarly, some aspects described in the context of the method may be expressed by features of blocks, items, or devices corresponding thereto. Some or all of the operations of the method may be performed by use of a hardware device such as a microprocessor, a programmable computer, or electronic circuits, for example. In some exemplary embodiments, one or more of the most important operations of the method may be performed by such a device.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of detecting an intruder performed by an intruder detection device for detecting an intruder based on images, comprising:

receiving input images acquired by multiple cameras;

extracting feature maps associated with a plurality of viewpoints by applying the input images to a plurality of convolutional neural networks provided separately for the plurality of viewpoints of the images; and detecting the intruder based on the feature maps associated with the plurality of viewpoints, wherein detecting the intruder based on the feature maps associated with the plurality of viewpoints comprises:

generating a combined feature map by combining the feature maps associated with the plurality of viewpoints and determining a first decision result based on the combined feature map;

obtaining a plurality of detection results by performing an intruder detection based on each of the feature maps associated with the plurality of viewpoints and combining the plurality of detection results to determine a second decision result; and combining the first decision result and the second decision result to determine a final decision result.

2. The method of claim 1, wherein extracting the feature maps associated with the plurality of viewpoints by applying the input images to the plurality of convolutional neural networks comprises:

classifying the input images into a plurality of image categories according to viewpoints of the input images; and applying images of each image category to respective one of the plurality of convolutional neural networks associated with the image category.

3. The method of claim 2, wherein the plurality of image categories comprises a front view image, a lateral view image, a planar view image, and a rear view image of an object.

4. The method of claim 3, wherein classifying the input images into the plurality of image categories according to the viewpoints of the input images comprises:

extracting a skeleton of the object from each input image; and determining an image viewpoint of the input image based on a length ratio between body parts in the skeleton.

5. The method of claim 2, further comprising:

transforming at least some of the images of each image category by rotating each image such that the object in each image elongates in a vertical direction in the image, wherein transformed images are applied to respective one of the plurality of convolutional neural networks associated with the image category.

6. The method of claim 1, wherein detecting the intruder based on the feature maps associated with the plurality of viewpoints comprises:

generating a combined feature map by combining the feature maps associated with the plurality of viewpoints; and determining an intruder detection result based on the combined feature map.

7. The method of claim 6, wherein generating the combined feature map by combining the feature maps associated with the plurality of viewpoints comprises:

calculating a weighted sum by applying predetermined weights on the feature maps associated with the plurality of viewpoints.

8. The method of claim 7, wherein the predetermined weights for the feature maps associated with the plurality of viewpoints are determined to minimize a loss function in the training of the convolutional neural networks.

9. The method of claim 1, wherein detecting the intruder based on the feature maps associated with the plurality of viewpoints comprises:

obtaining a plurality of detection results by performing an intruder detection based on each of the feature maps associated with the plurality of viewpoints; and combining the plurality of detection results.

10. The method of claim 1, further comprising:

detecting continual postures of the intruder in images associated with the intruder to estimate a behavior of the intruder.

11. The method of claim 10, wherein detecting continual postures of the intruder in images associated with the intruder to estimate a behavior of the intruder comprises:

classifying and accumulating the postures of the intruder in the images associated with the intruder; and comparing a sequence of accumulated postures with a posture pattern for a predetermined behavior.

12. The method of claim 11, wherein classifying and accumulating the postures of the intruder in the images associated with the intruder comprises:

extracting a skeleton of an object from each input image; and determining the posture of the intruder based on the skeleton.

13. A video surveillance system for detecting an intruder based on images, comprising:

a memory storing program instructions; and a processor coupled to the memory and executing the program instructions stored in the memory, wherein the program instructions, when executed by the processor, causes the processor to:

establish a plurality of convolutional neural networks each being provided separately for respective one of a plurality of viewpoints of images;

receive input images acquired by multiple cameras;

extract feature maps associated with the plurality of viewpoints by applying the input images to the plurality of convolutional neural networks associated with the plurality of viewpoints of the images; and detect the intruder based on the feature maps associated with the plurality of viewpoints, wherein the program instructions causing the processor to detect the intruder based on the feature maps associated with the plurality of viewpoints comprises instructions causing the processor to:

generate a combined feature map by combining the feature maps associated with the plurality of viewpoints and determine a first decision result based on the combined feature map;

obtain a plurality of detection results by performing an intruder detection based on each of the feature maps associated with the plurality of viewpoints and combining the plurality of detection results to determine a second decision result; and combine the first decision result and the second decision result to determine a final decision result.

14. The video surveillance system of claim 13, wherein the program instructions causing the processor to extract the feature maps associated with the plurality of viewpoints by applying the input images to the plurality of convolutional neural networks comprises instructions causing the processor to:

classify the input images into a plurality of image categories according to viewpoints of the input images; and apply images of each image category to respective one of the plurality of convolutional neural networks associated with the image category.

15. The video surveillance system of claim of claim 14, wherein the program instructions causing the processor to classify the input images into the plurality of image categories according to the viewpoints of the input images comprises instructions causing the processor to:

extract a skeleton of the object from each input image; and determine an image viewpoint of the input image based on a length ratio between body parts in the skeleton.

16. The video surveillance system of claim 14, wherein the program instructions further causes the processor to:

transform at least some of the images of each image category by rotating each image such that the object in each image elongates in a vertical direction in the image, wherein transformed images are applied to respective one of the plurality of convolutional neural networks associated with the image category.

17. The video surveillance system of claim 13, wherein the program instructions further causes the processor to:

detect continual postures of the intruder in images associated with the intruder to estimate a behavior of the intruder.

18. The video surveillance system of claim 17, wherein the program instructions causing the processor to detect continual postures of the intruder in images associated with the intruder to estimate a behavior of the intruder comprises instructions causing the processor to:

classify and accumulating the postures of the intruder in the images associated with the intruder; and compare a sequence of accumulated postures with a posture pattern for a predetermined behavior.

\*     \*     \*     \*     \*